United States Patent [19]
Franklin et al.

[11] Patent Number: 5,403,227
[45] Date of Patent: Apr. 4, 1995

[54] MACHINE FOR GRINDING AND POLISHING TERMINATED FIBER OPTIC CABLES

[75] Inventors: Vinod J. Franklin, Hershey; James D. Kevern, Wellsville, both of Pa.

[73] Assignee: The Whitaker Corporation, Wilmington, Del.

[21] Appl. No.: 103,932

[22] Filed: Aug. 6, 1993

[51] Int. Cl.6 .............................................. B24B 7/16
[52] U.S. Cl. .................................. 451/168; 451/166
[58] Field of Search ................ 51/62, 67, 60, 59 R, 51/59 SS, 57, 357, 283 R, 142, DIG. 5, 4; 451/166, 165, 164, 162, 168, 173, 489, 41, 904, 304, 66

[56] References Cited

U.S. PATENT DOCUMENTS

| | | | |
|---|---|---|---|
| 2,926,465 | 3/1960 | Sommers | 51/142 |
| 3,971,163 | 7/1976 | Trombley | 51/62 |
| 4,649,670 | 3/1987 | Snyder | 51/284 R |
| 4,693,035 | 9/1987 | Doyle | 51/125 |
| 4,711,053 | 12/1987 | Snyder | 51/3 |
| 4,766,705 | 8/1988 | Dholakia | 51/283 R |
| 5,184,433 | 2/1993 | Maack | 51/60 |
| 5,185,966 | 2/1993 | Mock, Jr. | 51/283 R |

FOREIGN PATENT DOCUMENTS

| | | | |
|---|---|---|---|
| 0246064 | 10/1989 | Japan | 51/4 |

*Primary Examiner*—Robert A. Rose
*Attorney, Agent, or Firm*—June B. Schuette

[57] ABSTRACT

An automated machine is disclosed for grinding and polishing the terminated ends of the optical fibers in fiber optic cables. The machine utilizes abrasive material in strip form. The abrasive material is moved in a carriage along a linear path while the carriage is oscillated in a circle within a plane during polishing. There are three separate carriages operating concurrently, the first having a relatively course grade of abrasive while the others have finer grades. Fixtures holding the cables for polishing are held in fixture supports that are automatically fed toward the abrasive material during polishing and retracted after polishing is complete. The fixture engagement mechanism for the first carriage engages at a slower rate than do the mechanisms of the other carriages.

20 Claims, 6 Drawing Sheets

MACHINE FOR GRINDING AND POLISHING TERMINATED FIBER OPTIC CABLES

FIELD OF THE INVENTION

The present invention relates to a machine for grinding and polishing the terminated ends of optical fibers in fiber optic cables.

BACKGROUND OF THE INVENTION

Polishing machines for grinding and polishing the ends of fiber optic cables are usually of the type having a rotating abrasive disk that is maintained relatively flat. The optical fiber is secured in a fixture having a flat bottom. The end of the optical fiber that is to be polished projects slightly below this bottom surface, sometimes under the urging of a spring mechanism to control the forces on the fragile optical fiber. The fixture, with its fiber optic cable attached, is carefully lowered onto the rotating abrasive disk and made to undergo a standard polishing pattern such as circular or figure eight. The polishing usually occurs in a particular segment of the rotating disk so that, as polishing continues, the same abrasive surface is continually presented to the tips being polished. There are usually three or more stages of polishing that must be done in sequence, from relatively course abrasive to very fine. Prior to machine polishing, however, it is usually necessary to hand polish the tips to remove the protruding fiber stubs to prevent damage. In certain prior art polishing machines, during the final stage the bottom surface of the fixture contacts the abrasive disk so that the end of the optical fiber is polished to a flat surface flush with the bottom surface of the fixture. Other prior art polishing machines rely upon the tips of the optical fibers themselves in contact with the abrasive surface to maintain the axes of the fixture and the cables somewhat perpendicular to the surface of the abrasive material. In these machines the fixture itself does not contact the abrasive material, therefore, the quality of the final polished surfaces of the cable is dependant upon the amount of ferrule projection below the bottom of the fixture. Such projections will vary due to variations in the manufacturing of the terminated cables. That is, when the cables are loaded into the fixture they are positioned with respect to some feature of the connector such as a shoulder. This results in the tips of the optical fibers extending below the bottom surface of the fixture by varying amounts, the three tips that extend the farthest being the ones that establish the initial angle between the axes and the abrasive surface. With such an arrangement some of the optical fibers are polished more than others resulting in inconsistency and varying quality.

What is needed is a polishing machine that controls the relative motion of the tips of the optical fibers with respect to the abrasive material so that fresh abrasive is always presented to the tips for efficient and high quality polishing. To eliminate the need for preparatory hand polishing, the machine should allow for relatively slow engagement during the initial stage of polishing with a more normal rapid engagement during later stages. Additionally, the tips of the optical fibers should be located in a plane that is parallel with the abrasive surface prior to polishing and the fixture that holds the fiber optic cables should be maintained in this plane during polishing, thereby obviating the alignment and quality problems mentioned above or the need for the fixture to contact the abrasive material to maintain vertical alignment.

SUMMARY OF THE INVENTION

An automated machine is disclosed for grinding and polishing the terminated ends of optical fibers in fiber optic cables. The machine includes a frame, a workstation in the frame, and an abrasive material having a flat surface defining a first plane within the workstation. A carrier means is provided for holding the abrasive material and moving it along a first path within the plane. Coupling means is provided for coupling the carrier to the frame so that the carrier undergoes oscillating motion to move the abrasive material along an arcuate second path within the first plane. A drive means effects the oscillating motion of the carrier. A fixture for holding the fiber optic cables is arranged so that the ends of the optical fibers are in a desired relation to the abrasive material in the first plane, including means for securing the fixture in the frame.

DESCRIPTION OF THE PREFERRED EMBODIMENT

Figure 1:
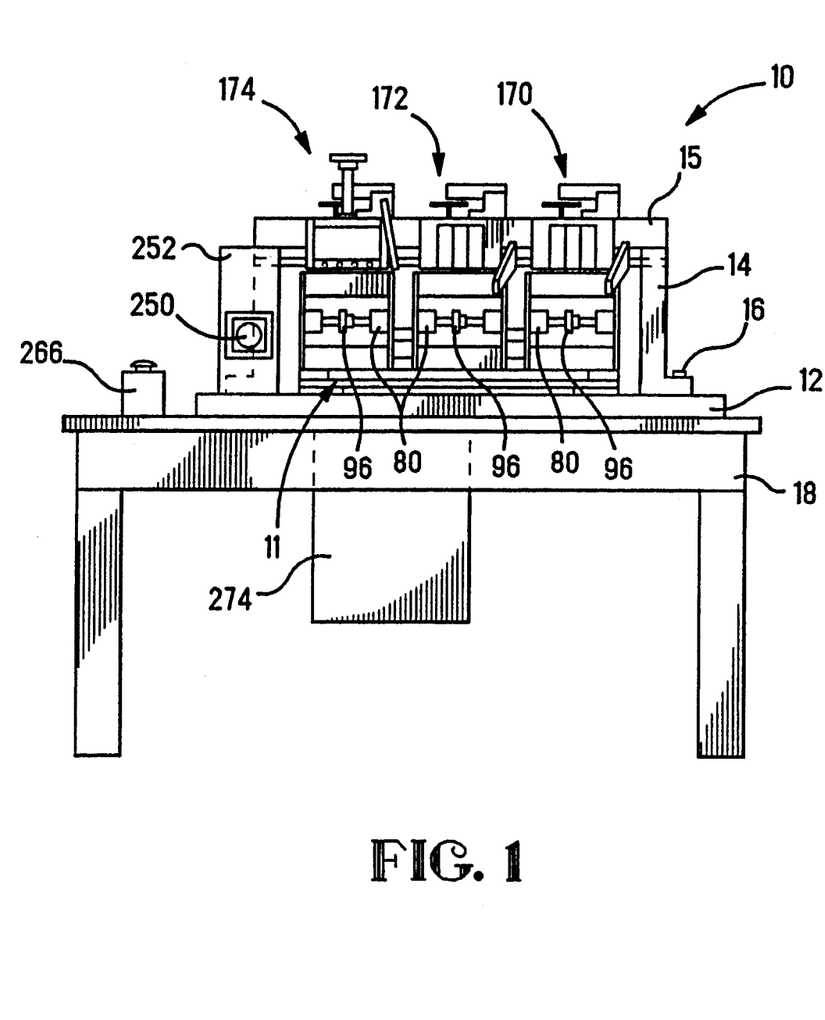
FIG. 1 is a front view a polishing machine incorporating the teachings of the present invention.
Figure 2:
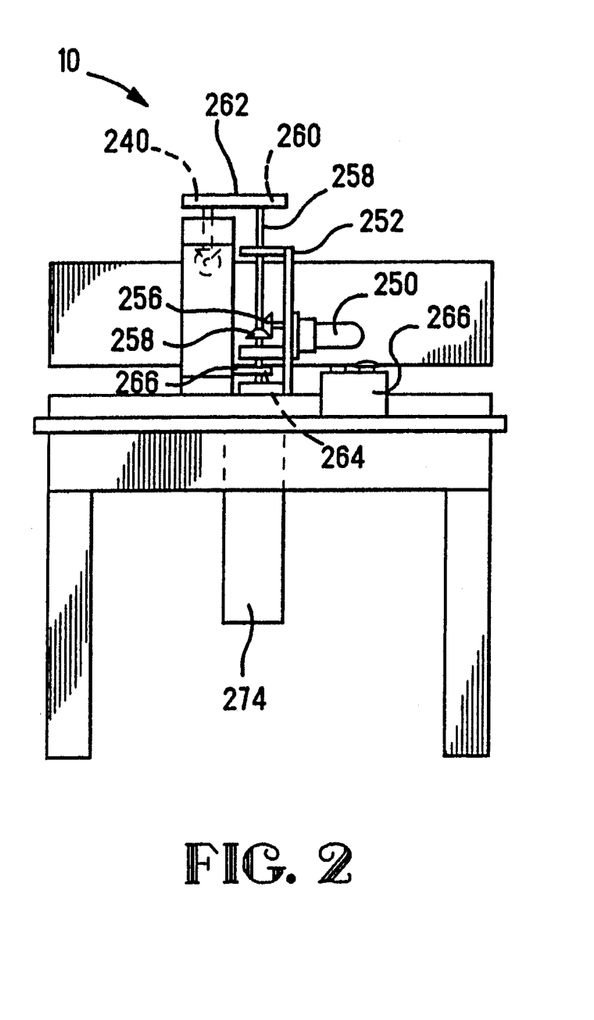
FIG. 2 is a side view of the machine shown in FIG. 1.
Figure 3:
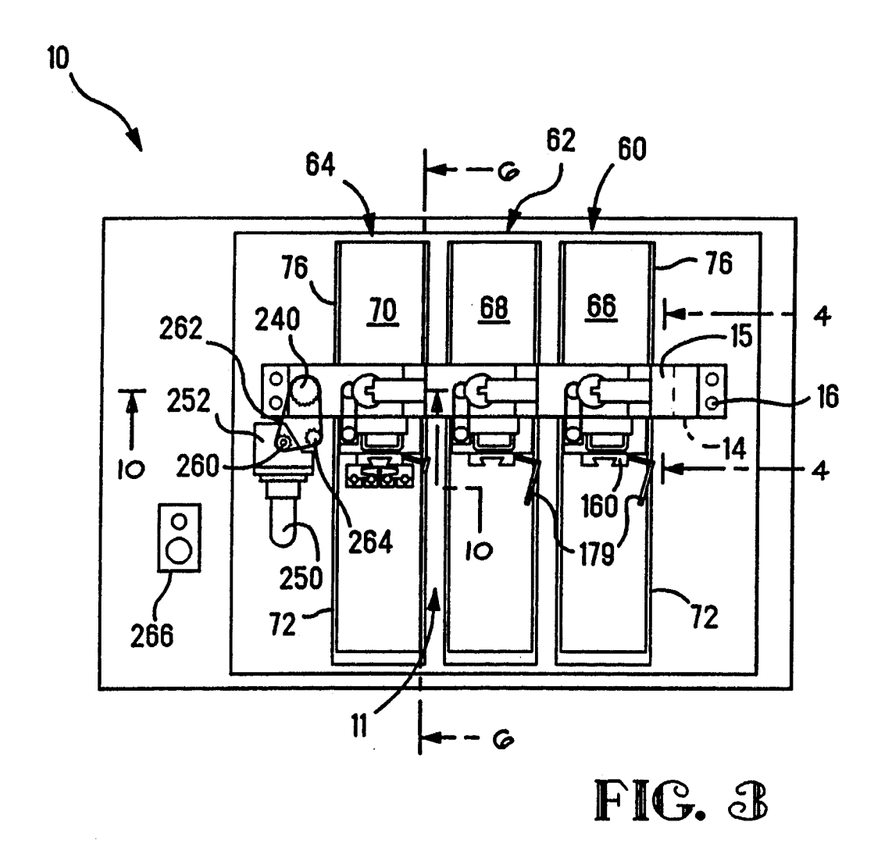
FIG. 3 is a top view of the machine shown in FIG. 1.
Figure 4:
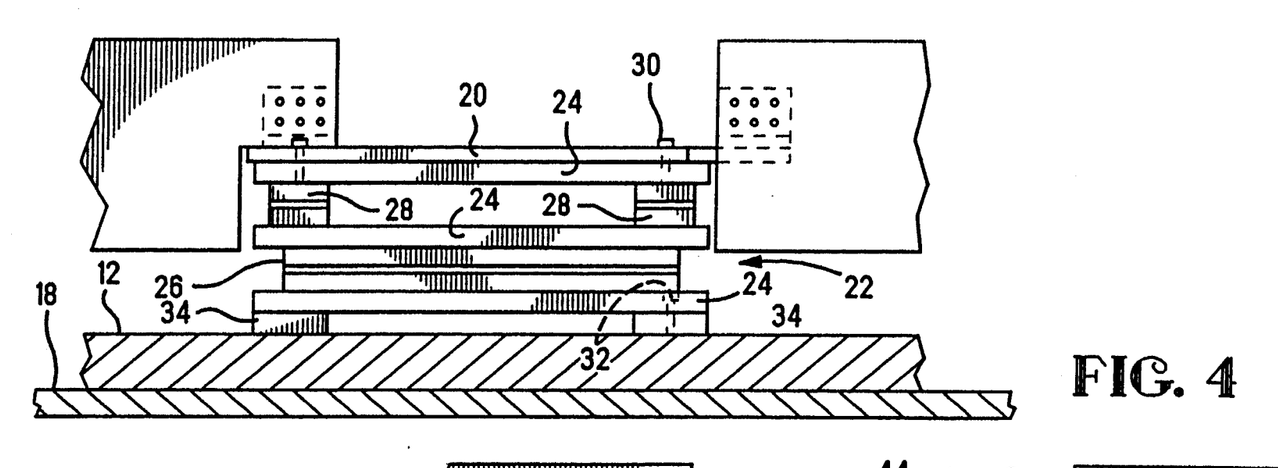
FIG. 4 is a partial cross-sectional view taken along the lines 4—4 in FIG. 3.
Figure 5:
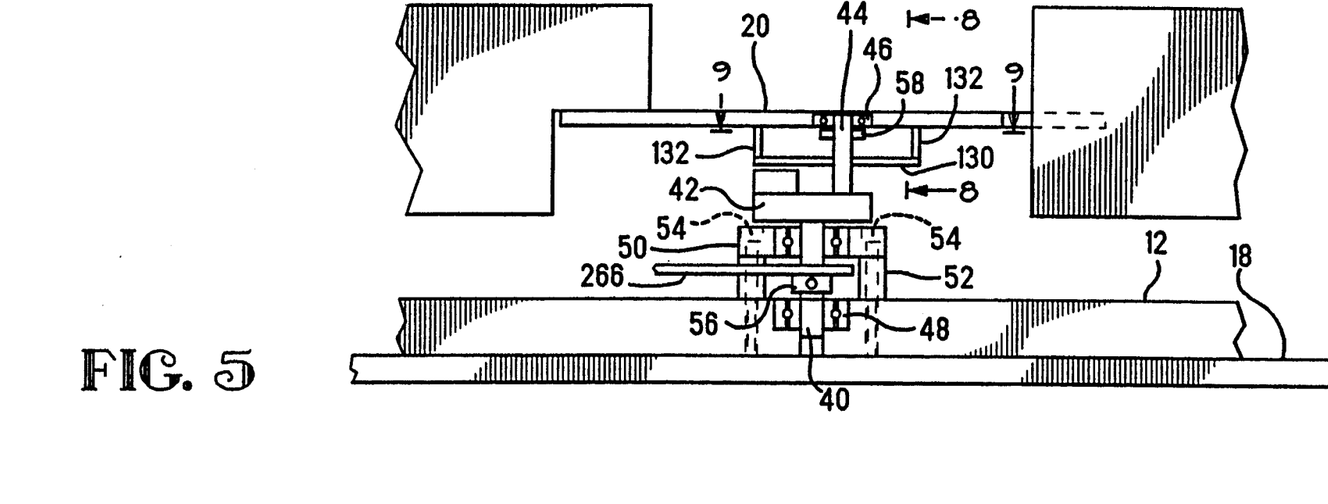
FIG. 5 is a view similar to that of FIG. 4 with the orthogonal slide assembly removed.

There is shown in FIGS. 1, 2, and 3 a grinding and polishing machine 10 having a workstation 11 for finishing the terminated ends of fiber optic cables. The machine includes a frame consisting of a base plate 12 and a U-shaped support 14 secured to the base plate by four screws 16. The base plate 12 is mounted to a suitable table 18 to position the machine for convenient operator access. As shown in FIG. 4 a rectangular carriage plate 20 is coupled to the base plate 12 with an orthogonal slide assembly 22 therebetween. The slide assembly consists of three rectangular shaped, open center, members 24 separated by two pairs of slides 26 and 28 which are attached to the members 24 by any suitable means. The upper most member 24 is attached to the bottom of the carriage plate 20 by the screw fasteners 30 and the lower most member 24 is attached to the base plate 12 by screw fasteners 32, which are threaded into the base plate. A pair of spacer blocks 34 are disposed between the lower most member 24 and the base plate 12, as best seen in FIG. 4. The pair of slides 26 allow movement in one direction while the pair of slides 28 allow movement in a transverse direction. This allows the carriage plate 20 to move in any direction within a plane that is parallel to the base plate 12. As shown in FIG. 5, a drive shaft 40, vertically disposed with respect to the base plate 12, is coupled to the carriage plate 20 by means of an eccentric crank 42 having a shaft 44 extending from the crank along an axis that is parallel to, but offset from the axis of the drive shaft. The shaft 44 extends into a slip fit bushing 46 that is pressed into a hole in the carriage plate 20. The drive shaft is journaled for rotation in two ball bearings 48, one of which is in a counterbore in the base plate 12 and the other of which is in a bearing support plate 50. The plate 50 is positioned on a pair of spacer blocks 52 and attached to the base plate 12 with the screws 54. A sprocket wheel 56 is attached to the drive shaft 40 and is interconnected to a source of rotational power as will be described below. The sprocket 56 includes a one way clutch, not shown, that allows rotational power to be transmitted in only one direction, for a purpose that will be explained below. A gear 58 is rigidly attached to and rotates with the shaft 44 for a purpose that will be explained below.

Figures 6, 7:
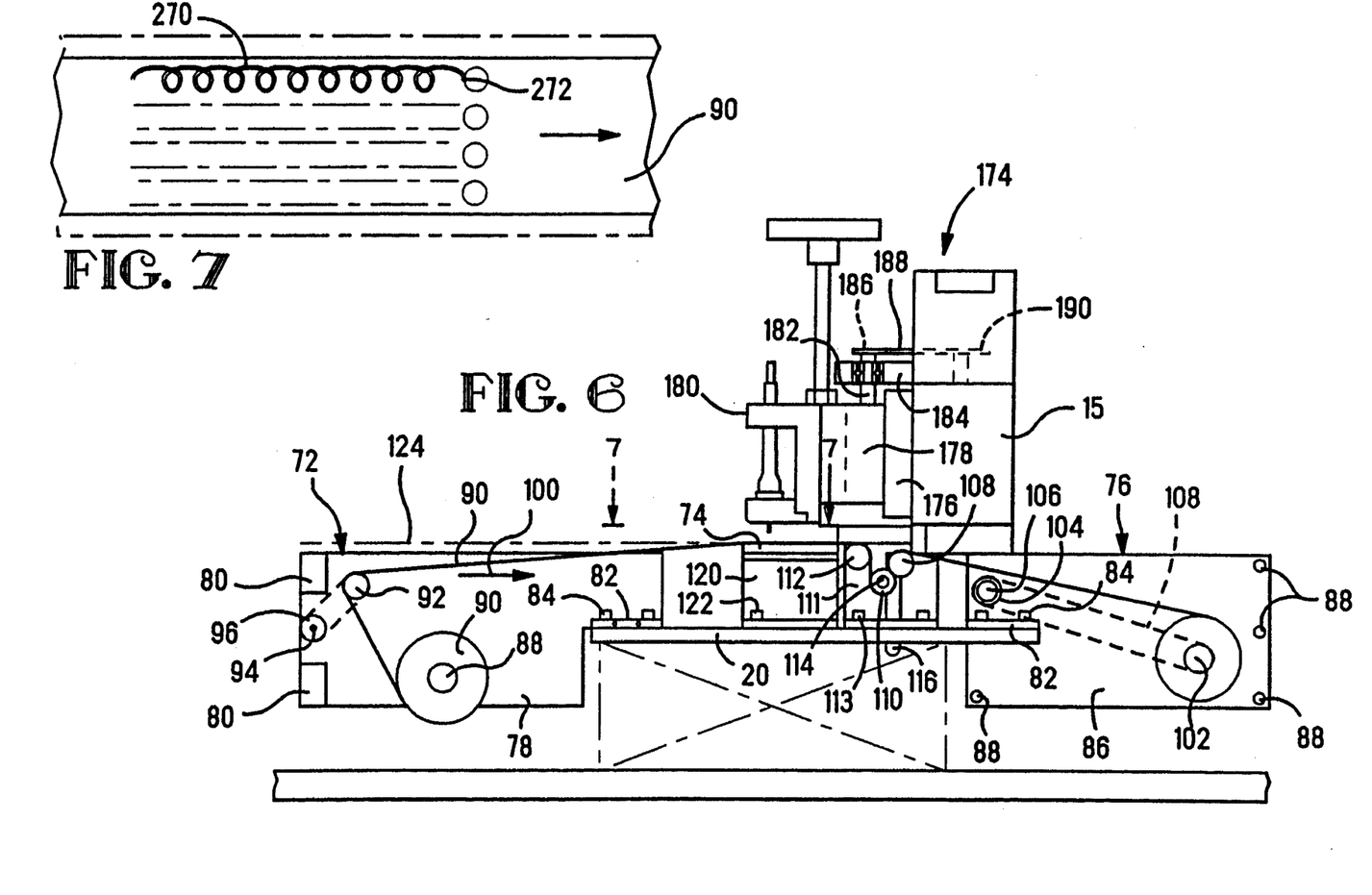
FIG. 6 is a cross-sectional view taken along the lines 6—6 of FIG. 3.
FIG. 7 is a partial top view of a portion of one of the carriages taken along the lines 7—7 in FIG. 6.

Three carriages 60, 62, and 64 are shown in FIGS. 1, 2, and 3 for carrying abrasive material of various grit sizes, in strip form. The carriage 60 carries a relatively coarse material 66 while the other two carriages 62 and 64 carry medium and fine grit materials 68 and 70 respectively. The carriages 60, 62, 64 are substantially identical, each consisting of a supply carriage 72, a take-up carriage 76, and a workstation platen 74 therebetween. The supply carriage has two side plates 78 spaced apart by two spacer blocks 80 at one end and a mounting plate 82 at the other end, as best seen in FIG. 6 The side plates 78 are attached to the spacer blocks and the mounting plate by means of screws threaded into the edges of the blocks and the plate. The mounting plate 82 is rigidly attached to the carriage plate 20 by means of the screws 84. The take-up carriage, being of similar structure, has two side plates 86 spaced apart by several spacer rods 88 and a mounting plate 82, which also is rigidly attached to the carriage plate by means of the screws 84. The two side plates 86 are secured to the spacer rods by means of screws threaded into the rods. All three of the carriages 60, 62, and 64 are attached to the carriage plate 20 in this manner resulting in a rigid assembly. The supply carriage includes a supply spindle 88 containing a roll of abrasive material 90 in strip form, an idler spindle 92 about which the abrasive material is passed, and a spindle 94 having a slip clutch 96. A belt 98 and sprockets couple the spindles 92 and 94 together so that a drag is created as the strip of abrasive material is pulled in the direction of the arrow 100, shown in FIG. 6. The take-up carriage includes a take-up spindle 102 for receiving and winding up the strip 90 of abrasive material after use, and a horizontally disposed shaft 104 journaled for rotation in the side plates 86. The shaft 104 extends through all three of the carriages 60, 62, and 64. Three sprockets 106 are arranged along the shaft 104 in alignment with similar sprockets attached to each of the take-up spindles 102. Three belts 108 interconnect these pairs of sprockets so that all of the take-up spindles are rotationally coupled to the shaft 104.

A shaft 114 extends horizontally through the three carriages 60, 62, and 64 and is journaled for rotation in a bracket 111 that is secured to the carriage plate 20 by screws 113. A pinch roller 110 is secured to the shaft 114 and a mating pinch roller 108 is in operational engagement therewith and is journaled for rotation in the bracket 111. A guide roller 112 is also journaled for rotation in the bracket 111. A similar bracket, pinch rollers, and guide roller are provided in alignment with each of the carriages 60, 62, and 64. The platen 74 is secured on a bracket 120 which is attached to the carriage plate 20 by screws 122. As is shown in FIG. 6, the strip 90 of abrasive material is threaded over the idler roller 92, over the platen 74, the guide roller 112, down around the driven pinch roller 110, and in between the two pinch rollers 110 and 108, then to the take-up spindle 102. The strip 90 of abrasive material is held firmly against the platen 74 by tension in the strip due to the affect of the drag of the slip clutch 96 while the pinch rollers are advancing the strip across the platen. The area of the strip 90 in contact with the platen, being a work area, defines a plane 124 within which the grinding and polishing takes place, and will be discussed further below. Since the abrasive material passes through the work area prior to engagement with the pinch rollers there is no possibility that abrasive material, damaged or contaminated by the pinch rollers, could adversely affect the quality of the polished cable end. The surface of the platen 74 may have some resiliency to soften the contact somewhat between the fragile tips of the optical fibers and the abrasive material during polishing. The surface resiliency of the platens in the three carriages 60, 62, and 64 may be different depending on the characteristics of the particular abrasive material being used in each and the type of fiber optic cable being finished.

Figures 8, 9:
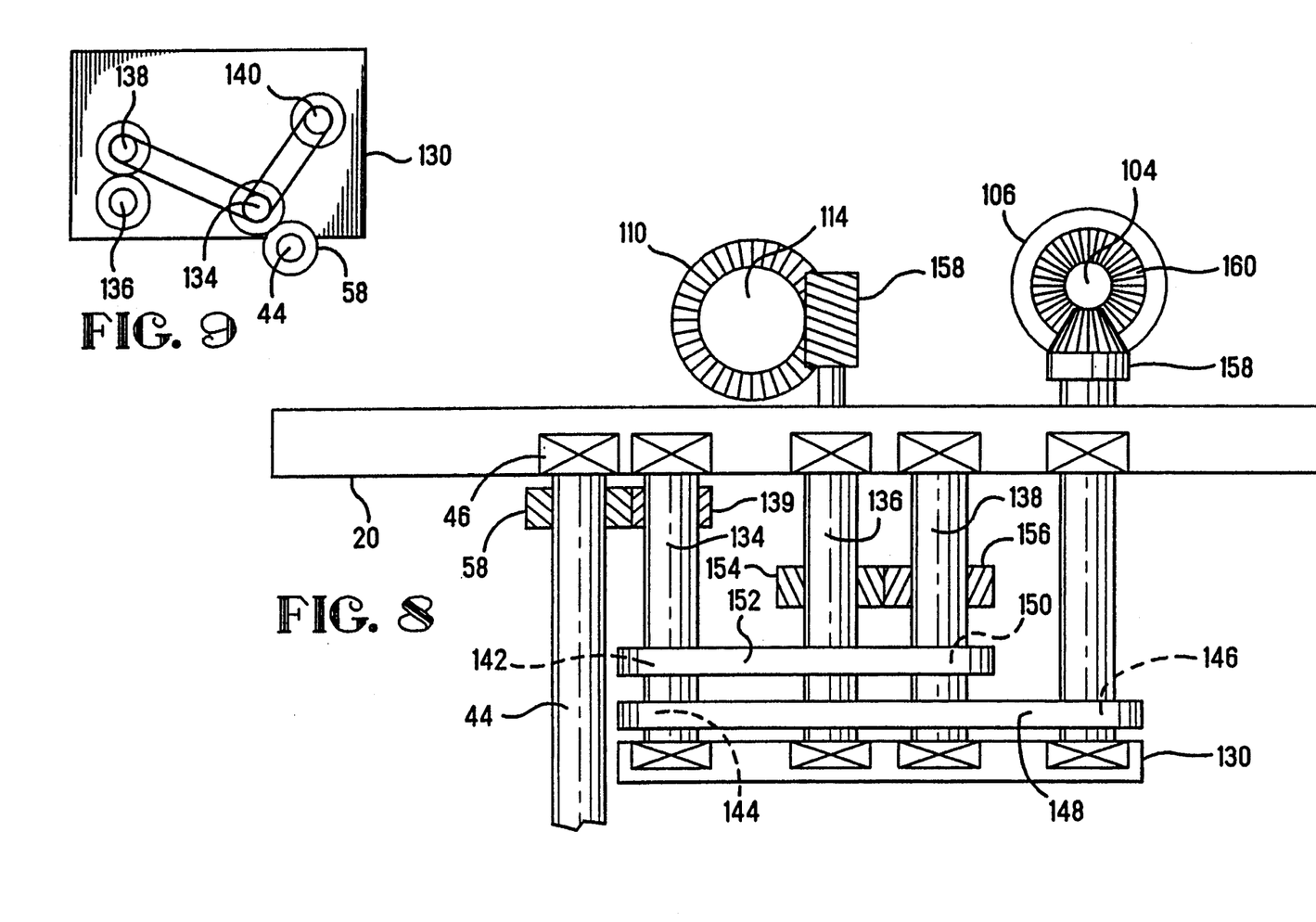
FIG. 8 is a partial cross-sectional view taken along the lines 8—8 in FIG. 5.
FIG. 9 is a partial cross-sectional view taken along the lines 9—9 in FIG. 5.

There is shown in FIGS. 8 and 9 the drive mechanism for the shafts 104 and 114 which advance the strip 90 of abrasive material. A bearing support plate 130 is spaced from the carriage plate 20 and rigidly attached thereto by spacer blocks 132, as best seen in FIG. 5. There are four shafts journaled for rotation in the bearing plate 130 and the carriage plate 20 by means of eight bearings, as shown. Note that these shafts are shown slightly out of position for clarity. They are a drive shaft 134, a pinch roller shaft 136, a gear reduction shaft 138, and a take-up drive shaft 140. The drive shaft 134 has a gear 139 attached thereto in mating engagement with the gear 58 and two sprockets 142 and 144. The take-up drive shaft 140 has a sprocket 146 attached thereto and is driven by a belt 148 that is in driven engagement with the sprocket 144. Similarly, the gear reduction shaft 138 has a sprocket 150 attached thereto and is driven by a belt 152 that is in driven engagement with the sprocket 142. The pinch roller shaft 136 and the gear reduction shaft 138 each have mating gears 154 and 156 attach thereto respectively. A worm gear 158 is formed on the end of the shaft 136 and is in driving engagement with a mating worm gear formed in the shaft 114. The gear 156 is smaller than the gear 154 to provide the desired gear ratio to the shaft 114. The take-up drive shaft 140 extends above the carriage plate 20 and has a bevel gear 158 attached thereto. The shaft 104 has a bevel gear 160 in mating engagement with the bevel gear 158 for driving the shaft 104. It will be appreciated that as the crank 42 is rotated, the crank pin 44 also rotates carrying along with it the gear 58. This then drives the shaft 134 which in turn drives the shafts 136 and 140.

As is shown in FIGS. 1, 2, 3, and 6, the U-shaped support 14 includes a horizontal bar 15 that extends over the three carriages 60, 62, and 64 and carries the engagement mechanisms 170, 172, and 174 that support and move the cable holding fixtures toward and away from the abrasive material in the work station. Each engagement mechanism is vertically over its respective carriage in position for moving the tips of fiber optic cables into polishing engagement with the respective strips of abrasive material. The three engagement mechanisms are substantially identical in construction, except that the mechanism 170 moves at a slower rate than do the other two mechanisms, for a purpose that will be set forth below. The engagement mechanism 174 will be described in detail here. It will be understood that each of the three engagement mechanisms have similar structures. As shown in FIG. 6, the mechanism 174 includes a slide 176 having its stationary member attached to the bar 15 and a fixture support 178 attached to the movable member of the slide. The fixture support 178 includes a dovetail for receiving a mating tenon of a cable holding fixture 180, as best seen in FIG. 6 and includes a locking lever 179, as best seen in FIG. 3, that securely locks the fixture to the fixture support. The fixture 180 is arranged to accurately position and hold a plurality of fiber optic cables so that the tips of their optical fibers are in a common plane that is coplanar with the plane 124. Such a fixture is disclosed in copending patent application Ser. No. 08/088,711, filed Jul. 8, 1993, and having attorney docket number 15629, which is incorporated herein by reference. A lead screw 182 is arranged parallel to the dovetail and is journaled for rotation in a bracket 184 attached to the bar 15. The lead screw 182 is in threaded engagement with a nut attached to the fixture support 178 so that as the lead screw is rotated in one direction the fixture support is advanced toward the platen 74 and when rotated in the other direction the fixture support is withdrawn away therefrom. A sprocket 186 is attached to the top end of the lead screw 182 and is driven by a belt 188 that couples the sprocket 186 to a drive sprocket 190.

Figure 10:
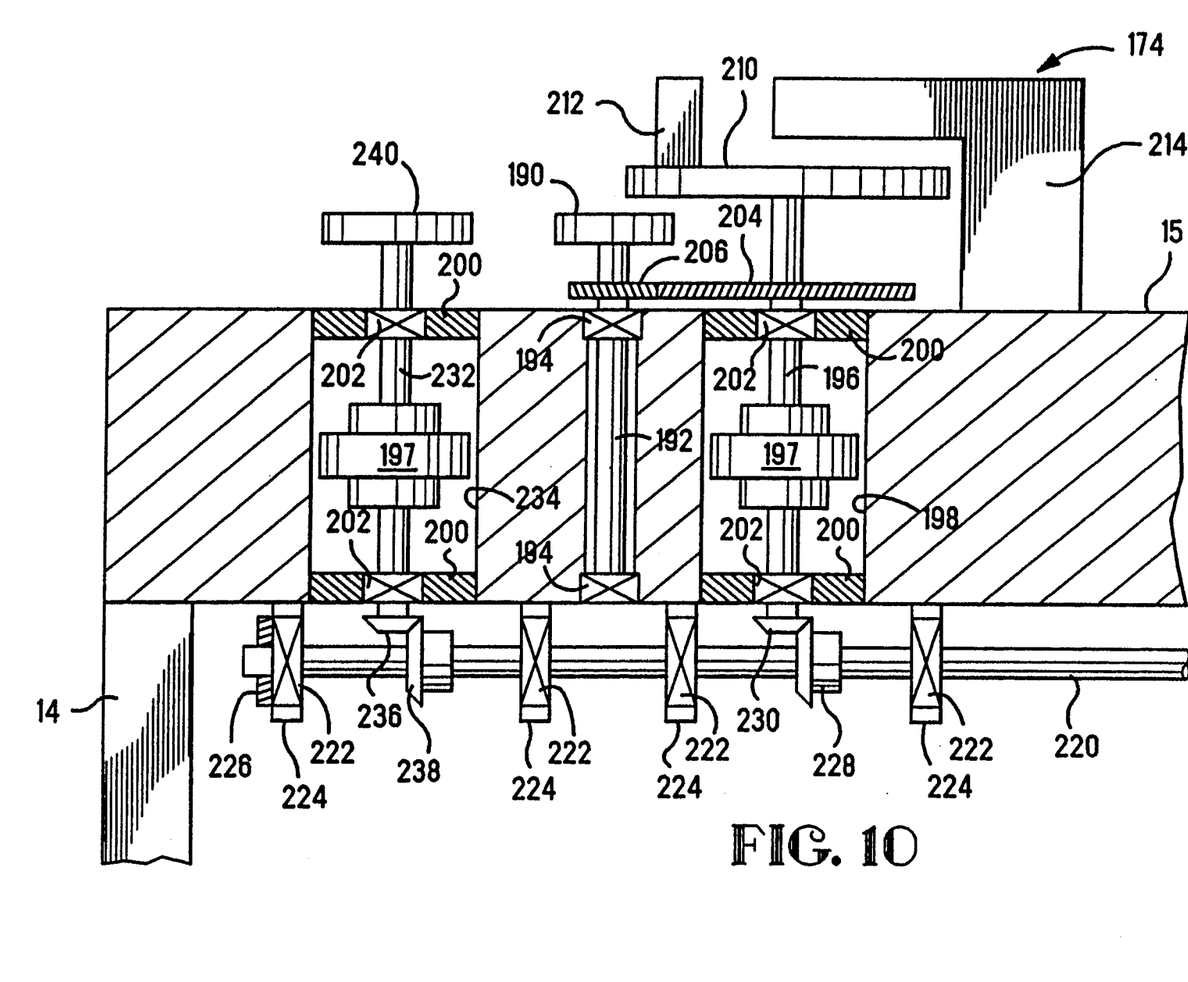
FIG. 10 is a partial cross-sectional view taken along the lines 10—10 in FIG. 3.

As best seen in FIG. 10, the sprocket 190 is attached to a shaft 192 that is journaled in bearings 194 pressed into bores formed in the upper and lower surfaces of the bar 15. A second shaft 196 is disposed in a larger bore 198 formed through the bar 15, adjacent the shaft 192. The shaft 196 includes a slip clutch 197 that will slip at a preset torque allowing one end to rotate freely while the other end remains stationary. The bore 198 is closed at each end by a bushing 200 that is held in place by a set screw threaded into the wall of the bar 15. The shaft 196 is journaled in bearings 202 which are pressed into holes formed in the bushings 200. A gear 204 is attached to the shaft 196 and is in mating engagement with a gear 206 that is attached to the shaft 192 so that as the shaft 196 is rotated the shaft 192 also rotates as well as does the lead screw 182. A disk 210 having a pin 212 extending upwardly therefrom is rigidly attached to the end of the shaft 196 above the bar 15. A stop bar 214 is attached to the top surface of the bar 15, as shown in FIG. 10, and is arranged to abut the pin 212 when the disk 210 is rotated far enough in either direction, thereby limiting the rotation of the gear 204 to less than one full turn. By choosing the gear ratio of the two gears 204 and 206, any desired velocity of movement of the fixture 180 toward the platen 74 can be achieved. By varying the thickness of the stop bar 214, the amount of rotation of the disk 210 can be controlled and thereby the exact position of the fixture 180, relative to the platen 174, can be adjusted. A horizontal drive shaft 220 extends along the lower surface of the bar 15 over the three carriages 60, 62, and 64. The shaft 220 is journaled for rotation in bearings 222 that are pressed into blocks 224 that in turn are attached to the bar 15 by suitable screw fasteners. A collar 226 is secured to each end of the shaft 220 to control end play. A bevel gear 228 is attached to the shaft 220 in driving engagement with a mating bevel gear 230 attached to the shaft 196. As shown in FIG. 10, a shaft 232 is disposed in a bore 234 formed through the bar 15 near the left most end thereof. The shaft 232 includes a slip clutch 197 and is journaled in bearings 202 that are pressed into bushings 200 and held in the bore 234 by set screws in a manner similar to that of the shaft 196. The shaft 232 has a bevel gear 236 attached to the end thereof in driving engagement with a mating bevel gear 238 attached to the shaft 220. A sprocket 240 is attached to the top of the shaft 232 above the bar 15, as viewed in FIG. 10. As best seen in FIGS. 1, 2, and 3, a motor 250 is mounted on a bracket 252 which is rigidly attached to the base plate 12. A bevel gear 254 attached to the output shaft of the motor is in driving engagement with a bevel gear 256 attached to a vertically disposed shaft 258. The shaft 258 is journaled in bearings in the end flanges of the bracket 252. A sprocket 260 is attached to an end of the shaft 258 that extends above the top surface of the bar 15 so that the sprocket 260 is in alignment with the sprocket 240. A drive belt 262 rotationally couples the two sprockets 240 and 260. An idler sprocket 264 and associated shaft and bearings are provided for adjustment. A sprocket 264 is attached to the lower end of the shaft 258 in alignment with the sprocket 56 on the shaft 40 shown in FIG. 5. A belt 266 drivingly couples the shaft 258 to the shaft 40. This arrangement provides the necessary circular movement of the carriage plate 20, the linear movement of the strip 90 of abrasive material, and the movement of the fixtures 180 toward and away from the abrasive material, by means of the single motor 250. An on-off switch 266 is arranged on the table 18 in a convenient location. The switch 266 signals a programmable controller 274, that is attached to the under side of the table 18, to initiate the polishing cycle.

In operation, fixture having fiber optic cables to be polished is loaded into the fixture support 178 of the carriage 60 and the locking handle 179 closed to lock the fixture in place. The switch 266 is actuated and the programmable controller begins the polishing cycle by starting the motor 250. As rotational power is transmitted throughout the system the carriage plate and the attached three carriages 60, 62, and 64 begin to oscillate so that the surface of the strip 90 of abrasive material in direct engagement with the platen 74 undergoes circular motion in the plane 124. Simultaneously, the pinch rollers 108 and 110 advance the strip 90 from left to right toward the take-up spindle 102, as viewed in FIG. 6. Simultaneously, the lead screw 182 is rotated by the engagement mechanism 170 at a desired slow rate, as established by the ratio of the two gears 204 and 206 as set forth above. As rotation of the lead screw 182 continues, the tips of the optical fibers of the cables held in the fixture begin to engage the strip 90 of abrasive material at this relatively slow rate and are ground smooth. The rate of feed of the tips of the optical fibers toward the abrasive material is chosen to be less than the rate of removal of material from the grinding process so that any protruding fiber stubs will be ground down without damage to either the abrasive material or the optical fiber. This eliminates the need for hand preparation. The slow rate of engagement prevents over stressing the optical fibers. As the fixture continues to advance toward the platen 74, the tips are ground to a common length. As this occurs the pin 212 of the rotating disk 210 engages the stop bar 214 thereby stopping rotation of the gear 214 and halting the movement of the fixture toward the abrasive material. At this point the slip clutch 197 allows the shaft 220 to continue rotating.

While the motor 250 continues to run, the fixture 180 is held in this position for a specific time to allow adequate time for the grinding to be complete. As shown in FIG. 7, the combination of the circular motion, shown in phantom lines at 268, of the carriage plate 20 and the linear motion of the strip 90 of abrasive material through the carriage produces a helical path of contact 270 of the tip 272 of the optical fiber with the surface of the strip 90. The phantom lines on either side of the strip 90, shown in FIG. 7, represent the lateral limits of movement of the strip during oscillation of the carriage plate 20. Note that the tip is continually exposed to fresh abrasive as the operation continues. At the end of this time period the direction of the motor 250 is automatically reversed by the programmable controller 274 causing the power distribution shafts to also reverse direction. Because the sprocket 56 includes a one way clutch in its structure, it simply rotates in the opposite direction without transmitting power to the shaft 44, therefore, the oscillating motion of the carriage plate 20 and the linear motion of the strip 90 of abrasive material cease. However, the shaft 220 is now rotating in the opposite direction causing the engagement mechanism 174 to lift the fixture 180 away from the strip 90 of abrasive material. Such rotation continues until the pin 212 of the rotating disk 210 engages the opposite side of the stop bar 214, at which time the slip clutch 197 again begins to slip. The fixture 180 is now in its withdrawn position and the electrical power to the motor 250 is cut off by the programmable controller 274. The fixture 180 is then transferred from the fixture support in the carriage 60 to the fixture support in the carriage 62 and the process repeated. However, since the tips of the optical fibers in the fixture are now substantially flush with their ferules the engagement mechanism 174 of the carriage 62 may move the tips into engagement with the abrasive material at a faster rate. This is accomplished by a different ratio between the gears 204 and 206. Similarly, the ratio of these gears in the engagement mechanism of the carriage 64 is set for the faster rate.

An important advantage of the present invention is that the strip of abrasive material is moved, with respect to the tips of the ferrules, in both a circular path and a linear path so that the tips being polished are always moving over fresh abrasive material. There is no possibility that abrasive material, damaged or contaminated by the pinch rollers, could adversely affect the quality of the polishing operation. Additionally, the engagement mechanism of the first carriage has a much slower rate of engagement than the others to assure that the optical fibers in this first stage of grinding will be ground down without being over stressed or damaged by the grinding process. This eliminates the need for initial hand preparation to remove fiber stubs. The unique arrangement of the distribution of rotational power permits the use of only one motor for effecting the oscillating motion of the carriage plate, the linear motion of the strip of abrasive material, and the motion of the fixture engagement mechanism, resulting in significant cost savings to manufacture and to operate and maintain the machine.

We claim:

1. An automated machine for grinding and polishing the terminated ends of optical fibers in fiber optic cables, comprising:
    (a) a frame;
    (b) a workstation in said frame;
    (C) a rectangular strip of abrasive material having a longitudinal axis, said abrasive material having a flat surface defining a first plane within said workstation;
    (d) a carriage for holding said abrasive material and moving it along a first path within said plane, said carriage comprising;
        a member having a flat surface upon which said abrasive material is disposed within said first plane, a drive spindle and a supply spindle in operational engagement with said strip of abrasive material, wherein both said spindles are journaled for rotation in said carriage, and means for rotating said drive spindle causing said strip of abrasive material to move along said first path;
    (e) coupling means for coupling said carriage to said frame so that said carriage undergoes oscillating motion to move said abrasive material along a second path different from said first path within said first plane;
    (f) drive means for effecting said oscillating motion of said carriage;
    (g) a fixture for holding said fiber optic cables so that the ends of the optical fibers are in a desired relation to said abrasive material in said first plane; and
    (h) means for securing said fixture in said frame.

2. The machine according to claim 1 wherein said supply spindle is on one side of said work area and said drive spindle is on the opposite side of said work area and wherein said abrasive material moves along said first path in a direction from said supply spindle through said work area to said drive spindle.

3. The machine according to claim 1 wherein said carriage includes a pair of spaced parallel plates rigidly attached together and said member being disposed between said plates, the axes of said spindles being substantially normal to said plates.

4. The machine according to claim 1 wherein said oscillating motion is substantially circular motion so that said second path through which said abrasive material moves is a circular path.

5. The machine according to claim 1 wherein said coupling means comprises a movable plate to which said carrier means is attached and a pair of orthogonal oriented slide assemblies for coupling said movable plate to said frame, and means for moving said movable plate along said second path.

6. The machine according to claim 5 wherein said means for moving said movable plate comprises a motor, a drive shaft rotationally coupled to said motor, and an eccentric coupling between said drive shaft and said movable plate.

7. The machine according to claim 6 wherein said eccentric coupling is a crank pin attached to said drive shaft with said pin projecting therefrom into an opening in said movable plate.

8. The machine according to claim 7 including a gear attached to said crank pin said gear drivingly coupled to said drive spindle so that as said gear rotates with said drive shaft said abrasive material is moved along said first path.

9. The machine according to claim 1 including engagement means for holding said fixture in a first position away from said abrasive material and for moving said fixture at a first predetermined rate toward said abrasive material to a second position adjacent thereto, so that when said fixture is in said first position said end of said optical fibers are spaced from said abrasive material and when said fixture is moving toward said second position said ends of said optical fibers engage said abrasive material.

10. The machine according to claim 9 wherein said movement along said first path, said movement along said second path, and said movement of said fixture are all effected by means of a single motor.

11. The machine according to claim 9 including a second carriage similar to said carriage, a sheet of second abrasive material that is different from said abrasive material and having a flat surface defining a second plane within said workstation and arranged to move within said second carriage along a path parallel to said first path, a second fixture for holding said fiber optic cables so that the ends of the optical fibers are in a desired relation to said strip of second abrasive material, and engagement means for holding said second fixture in a first position away from said second abrasive material and for moving said second fixture at a second predetermined rate toward said second abrasive material to a second position adjacent thereto, so that when said second fixture is in said first position said end of said optical fibers are spaced from said second abrasive material and when said fixture is moving toward said second position said ends of said optical fibers engage said second abrasive material.

12. The machine according to claim 11 wherein said second predetermined rate is different than said first predetermined rate.

13. The machine according to claim 11 wherein said abrasive material and said second abrasive material are both in strip form and each of said carriage and said second carriage include a drive spindle and a supply spindle in operational engagement with its respective said strip of abrasive material, both of said spindles in said two carriages being journaled for rotation in their respective said carriage, including means for rotating each said drive spindle so that its said strip of abrasive material is caused to move along said first path.

14. A power tool comprising a housing, a yoke movably mounted on the housing, the yoke being provided with an enlarged bore, a ratchet wheel rotatably mounted in said enlarged bore and including a central aperture which is concentric with the enlarged bore, power means for driving the yoke in alternating pivotal directions about said ratchet wheel, a pair of complementary pawls pivotally mounted in said yoke, each pawl sized for extending into the enlarged bore and into engagement with the ratchet wheel, biasing means for urging the pawls toward the ratchet wheel, and pawl control means disposed in said enlarged bore for selectively disengaging one of said pawls from contact with the ratchet wheel, the pawl control means being also provided with a centrally located aperture which is in coaxial communication with the aperture of the ratchet wheel whereby an elongated threaded member can be inserted through the enlarged bore and apertures and a fastener may be rotatably driven on the member by the power tool.

15. A power tool comprising a housing, a yoke movably mounted on the housing, the yoke being provided with an enlarged bore, a ratchet wheel rotatably mounted in said enlarged bore and including a central aperture which is concentric with the enlarged bore, power means for driving the yoke in alternating pivotal directions about said ratchet wheel, a pair of complementary pawls pivotally mounted in said yoke, each pawl sized for extending into the enlarged bore and into engagement with the ratchet wheel, biasing means for urging the pawls toward the ratchet wheel, and pawl control means disposed in said enlarged bore for selectively disengaging one of said pawls from contact with the ratchet wheel, the pawl control means being a control member which is disposed within and supported for rotation about a central longitudinal axis of said enlarged bore.

16. In an automated machine for grinding and polishing the terminated ends of optical fibers in fiber optic cables, having: a frame; a workstation in said frame; an abrasive material having a flat surface defining a first plane within said workstation; carrier means for holding said abrasive material and moving it along a first path within said plane; coupling means for coupling said carrier to said frame so that said carrier undergoes oscillating motion to move said abrasive material along an second path within said first plane; drive means for effecting said oscillating motion of said carrier; a fixture for holding said fiber optic cables so that the ends of the optical fibers are in a desired relation to said abrasive material in said first plane; and means for securing said fixture in said frame, an engagement mechanism for holding said fixture in a first position away from said abrasive material and for moving said fixture at a predetermined rate toward said abrasive material to a second position adjacent thereto, so that when said fixture is in said first position said end of said optical fibers are spaced from said abrasive material and when said fixture is moving toward said second position said ends of said optical fibers engage said abrasive material.

17. The machine according to claim 16 where said engagement mechanism comprises:
(a) a slide having a stationary portion attached to said frame and a movable portion to which is removably mounted said fixture;
(b) a lead screw and nut assembly, said lead screw journaled for rotation in said frame and said nut attached to said movable portion of said slide;
(c) a motor;
(d) coupling means for drivingly coupling said motor to said lead screw so that said lead screw can be rotated in one direction to advance said fixture toward said second position at a predetermined rate, and in an opposite direction to retract said fixture to said first position.

18. The machine according to claim 17 wherein said coupling means includes a slip clutch and stop means for limiting rotation of said lead screw in both said directions thereby defining said first and second positions.

19. The machine according to claim 18 wherein said stop means comprises a spindle rotationally coupled to said slip clutch, a gear attached to said spindle and drivingly coupled to said lead screw, a member attached to said spindle that rotates therewith, and a stop attached to said frame so that when said fixture is in said first position said member is in abutting engagement with one side of said stop and when said fixture is in said second position said member is in abutting engagement with the other side of said stop.

20. The machine according to claim 16 wherein said grinding and polishing includes removal of material from said ends of said optical fibers at a specific rate, and wherein said predetermined rate of movement of said fixture toward said abrasive material is equal to or less than said specific rate.

* * * * *